US009031355B2

United States Patent
Chon

(10) Patent No.: US 9,031,355 B2
(45) Date of Patent: May 12, 2015

(54) METHOD OF SYSTEM FOR IMAGE STABILIZATION THROUGH IMAGE PROCESSING, AND ZOOM CAMERA INCLUDING IMAGE STABILIZATION FUNCTION

(71) Applicant: Samsung Techwin Co. Ltd., Changwon (KR)

(72) Inventor: Je-Youl Chon, Changwon (KR)

(73) Assignee: Samsung Techwin Co., Ltd., Changwon (KR)

(*) Notice: Subject to any disclaimer, the term of this patent is extended or adjusted under 35 U.S.C. 154(b) by 154 days.

(21) Appl. No.: 13/729,302

(22) Filed: Dec. 28, 2012

(65) Prior Publication Data

US 2013/0170770 A1 Jul. 4, 2013

(30) Foreign Application Priority Data

Dec. 29, 2011 (KR) .................. 10-2011-0146112

(51) Int. Cl.
*G06K 9/40* (2006.01)
*G06T 7/00* (2006.01)

(52) U.S. Cl.
CPC ..... *G06T 7/0044* (2013.01); *G06T 2207/10016* (2013.01); *G06T 2207/30232* (2013.01)

(58) Field of Classification Search
CPC ....... H04N 5/3572; G06T 5/003; G06T 5/006
USPC ........................... 382/255, 275, 298
See application file for complete search history.

(56) References Cited

U.S. PATENT DOCUMENTS

| 6,720,997 B1* | 4/2004 | Horie et al. ................ 348/218.1 |
| 2002/0136459 A1* | 9/2002 | Imagawa et al. ............. 382/218 |
| 2006/0133785 A1 | 6/2006 | Ko et al. |
| 2008/0310730 A1* | 12/2008 | Hayasaki ...................... 382/195 |
| 2009/0225174 A1* | 9/2009 | Handa et al. ............... 348/208.3 |

(Continued)

FOREIGN PATENT DOCUMENTS

| JP | 2006180479 A | 7/2006 |
| JP | 4767052 B2 | 6/2011 |

(Continued)

OTHER PUBLICATIONS

Yoneyama et al. ("Lens distortion correction for digital image correlation by measuring rigid body displacement," Opt. Eng. 45(2), 2006).*

(Continued)

*Primary Examiner* — Yubin Hung
(74) *Attorney, Agent, or Firm* — Sughrue Mion, PLLC

(57) ABSTRACT

A method and system for image stabilization through image processing, and a zoom camera including an image stabilization function. The method includes: determining whether an input image comprises a representative feature portion; sampling the representative feature portion to generate a sampled image if it is determined that the input image comprises the representative feature portion; enlarging the input image by an optical zooming, matching the enlarged input image with the sampled image, and obtaining a central coordinate of the enlarged input image and a central coordinate of the sampled image; and aligning an optical axis by calculating a difference between the central coordinate of the enlarged input image and the central coordinate of the sampled image.

10 Claims, 9 Drawing Sheets

(56) References Cited

U.S. PATENT DOCUMENTS

2010/0229452 A1 9/2010 Suk
2011/0169977 A1* 7/2011 Masuda .................... 348/222.1

FOREIGN PATENT DOCUMENTS

| KR | 100541618 | B1 | 1/2006 |
| KR | 1020100102959 | A | 9/2010 |
| KR | 101076487 | B1 | 10/2011 |

OTHER PUBLICATIONS

Amanatiadis et al. ("An integrated architecture for adaptive image stabilization in zooming operation," IEEE Trans. Consumer Electronics, vol. 54, No. 2, 2008, pp. 600-608).*
Kim et al. ("Automatic radial distortion correction in zoom lens video camera," J. Electronic Imaging, 19(4), 2010).*

* cited by examiner

METHOD OF SYSTEM FOR IMAGE STABILIZATION THROUGH IMAGE PROCESSING, AND ZOOM CAMERA INCLUDING IMAGE STABILIZATION FUNCTION

CROSS-REFERENCE TO RELATED PATENT APPLICATION

This application claims priority from Korean Patent Application No. 10-2011-0146112, filed on Dec. 29, 2011, in the Korean Intellectual Property Office, the disclosure of which is incorporated herein in its entirety by reference.

BACKGROUND

1. Field

Methods and apparatuses consistent with exemplary embodiments relate to image stabilization through image processing, and a zoom camera including an image stabilization function.

2. Description of the Related Art

Recently, many surveillance cameras are installed in buildings and streets to prevent crimes and theft. An image captured by a surveillance camera displays a current state of a place where the surveillance camera is installed through a monitor in a police station or a management office of a building. In general, a surveillance camera has a zoom function to enlarge or reduce an object to provide lots of user convenience.

However, in the surveillance camera having the zoom function, an optical axis error occurs when an imaging device, such as a plurality of lens groups and a charge-coupled device (CCD), is assembled in the surveillance camera or due to various factors such as a tolerance of an optical system, and thus, an optical axis of the surveillance camera is changed according to zoom change.

FIGS. 1A to 1C are images showing when an optical axis error occurs in an image captured by a zoom camera.

Referring to FIG. 1, a portion marked with '+' in FIG. 1A represents a central area of the image. However, comparing the image of FIG. 1A with the image of FIG. 1B captured by zooming-in the zoom camera, the central area marked with '+' of FIG. 1A is moved as shown in FIG. 1B, which shows that an optical axis error occurs. Accordingly, as shown in FIG. 1C, there is a need for a method of compensating for the optical axis error so that the central area of the image is maintained at its original position even after the image is enlarged.

In general, a method of mechanically image stabilization has been provided. However, this method has a problem that if a physical impact is applied to a camera after compensating for the optical axis error or if a long time elapses, a physical compensation should be applied to the camera again.

SUMMARY

One or more exemplary embodiments provide a method and system for determining whether an input image includes a representative feature portion through image processing and image stabilization by using an image matching method when the input image includes the representative feature portion and compensating for the optical axis error by using optical flow information if the input image includes no representative feature portion, and a zoom camera including an image stabilization function.

According to an aspect of an exemplary embodiment, there is provided a method of image stabilization, the method including: determining whether an input image comprises a representative feature portion; sampling the representative feature portion to generate a sampled image if it is determined that the input image comprises the representative feature portion; enlarging the sampled image, matching the enlarged sampled image with the sampled image, and obtaining a central coordinate of the matched image; and aligning an optical axis by calculating a difference between the central coordinate of the matched image and a central coordinate of the sampled image.

The representative feature portion may have an illuminance level higher than a predetermined illuminance level or comprises a predetermined shape, and is selected from among a plurality of feature portions in the input image.

The determining of whether the input image includes a representative feature portion may include: extracting the plurality of feature portions from the input image; selecting a candidate feature portion having a predetermined feature from among the extracted feature portions; and determining that the input image includes the representative feature portion if the enlarged sampled image includes the candidate feature portion, and determining that the input image does not include the representative feature portion if the enlarged sampled image does not include the candidate feature portion.

The matching of the enlarged sampled image with the sampled image may include performing scale invariant feature transform (SIFT) matching if the sampled image is enlarged at a magnification equal to or less than 2.5.

The matching of the enlarged sampled image with the sampled image may include performing template matching by resizing the sampled image by a magnification at which the sampled image is enlarged if the sampled image is enlarged at a magnification equal to or greater than 2.5.

According to an aspect of another exemplary embodiment, there is provided a method of image stabilization, the method including: determining whether an input image comprises a representative feature portion; calculating optical flows of the input image during enlargement of the input image, if it is determined that the input image does not comprise the representative feature portion; obtaining optical axis error information by using optical flow information obtained from the calculated optical flows; and aligning an optical axis by using the obtained optical axis error information.

The calculating of the optical flows may include obtaining the input image according to a predetermined number of frames during the enlargement of the input image.

The obtaining of the optical axis error information may include forming an optical flow histogram based on at least one distance from a center of the input image and at least one direction at each of the at least one distance.

The optical axis error information may be obtained only if directions of minimum and maximum values of the optical flows at each of the at least one distance are symmetrical to each other.

The optical axis error information may be obtained based on a difference between an average value and a minimum value of the optical flows at each of the at least one distance.

According to an aspect of another exemplary embodiment, there is provided an image stabilization system including: a representative feature portion presence determining unit which determines whether an input image comprises a representative feature portion; a sampling unit which samples the representative feature portion to generate a sample image if it is determined that the input image comprises the representative feature portion; a matching unit which enlarges the sampled image, matches the enlarged sampled image with the sampled image, and obtains a central coordinate of the matched image; and an optical axis aligning unit which aligns an optical axis by calculating a difference between the central coordinate of the matched image and a central coordinate of the sampled image.

The representative feature portion may have an illuminance level higher than a predetermined illuminance level or comprises a predetermined shape, and is selected from among a plurality of feature portions in the input image.

The representative feature portion presence determining unit may extract the plurality of feature portions from the input image, select a candidate feature portion having a predetermined feature from among the extracted feature portions, determine that the input image includes the representative feature portion if the enlarged sampled image includes the candidate feature portion, and determine that the input image does not include the representative feature portion if the enlarged sampled image does not include the candidate feature portion.

The matching unit may match the enlarged sampled image with the sampled image by scale invariant feature transform (SIFT) matching if the sampled image is enlarged at a magnification equal to or less than 2.5.

The matching unit may match the enlarged sampled image with the sampled image by template matching by resizing the sampled image by the magnification at which the sampled image is enlarged if the sampled image is enlarged at a magnification equal to or greater than 2.5.

According to an aspect of another exemplary embodiment, there is provided an image stabilization system including: a representative feature portion presence determining unit which determines whether an input image comprises a representative feature portion; an optical flow calculating unit which calculates optical flows of the input image during enlargement of the input image, if it is determined that the input image does not comprise the representative feature portion; an error information extracting unit which obtains optical axis error information by using optical flow information obtained from the calculated optical flows; and an optical axis aligning unit which aligns an optical axis by using the obtained optical axis error information.

The optical flow calculating unit may calculate the optical flows by obtaining the input image according to a predetermined number of frames during the enlargement of the input image.

The error information extracting unit may obtain the optical axis error information by forming an optical flow histogram based on at least one distance from a center of the input image and at least one direction at least of the at least one distance.

The error information extracting unit may obtain the optical axis error information only if directions of minimum and maximum values of the optical flows at each of the at least one distance are symmetrical to each other.

The error information extracting unit may obtain the optical axis error information based on a difference between an average value and a minimum value of the optical flows at each of the at least one distance.

According to an aspect of another exemplary embodiment, there is provided a zoom camera including: a representative feature portion presence determining unit which determines whether an input image comprises a representative feature portion; an optical axis error calculating unit which obtains optical axis error information by matching a sample image including the representative feature portion and an enlarged sample image if the representative feature portion presence determining unit determines that the input image comprises a representative feature portion, and obtaining the optical axis error information by calculating optical flow information between at least two images corresponding to the input image if the representative feature portion presence determining unit determines that the input image does not comprise the representative feature portion; and an optical axis aligning unit which compensates for an optical axis error by using the obtained optical axis error information.

BRIEF DESCRIPTION OF THE DRAWINGS

The above and other aspects will become more apparent by describing in detail exemplary embodiments thereof with reference to the attached drawings, in which.

DETAILED DESCRIPTION OF THE EXEMPLARY EMBODIMENTS

Figure 1A:
FIGS. 1A to 1C are images showing when an optical axis error occurs in an image captured by a zoom camera.

The inventive concept will now be described more fully with reference to the accompanying drawings, in which exemplary embodiments of the inventive concept are shown. The exemplary embodiments will be described in detail such that one of ordinary skill in the art may easily work the inventive concept. It should be understood that the exemplary embodiments of the inventive concept may vary but do not have to be mutually exclusive. For example, particular shapes, structures, and properties according to a predetermined embodiment described in this specification may be modified in other embodiments without departing from the spirit and scope of the inventive concept. In addition, positions or arrangement of individual components of each of the exemplary embodiments may also be modified without departing from the spirit and scope of the inventive concept. Accordingly, the detailed description below should not be construed as having limited meanings but construed to encompass the scope of the claims and any equivalent ranges thereto. In the drawings, like reference numerals denote like elements in various aspects.

Hereinafter, the inventive concept will now be described more fully with reference to the accompanying drawings, in which exemplary embodiments of the inventive concept are shown such that one of ordinary skill in the art may easily work the inventive concept.

Figure 2:
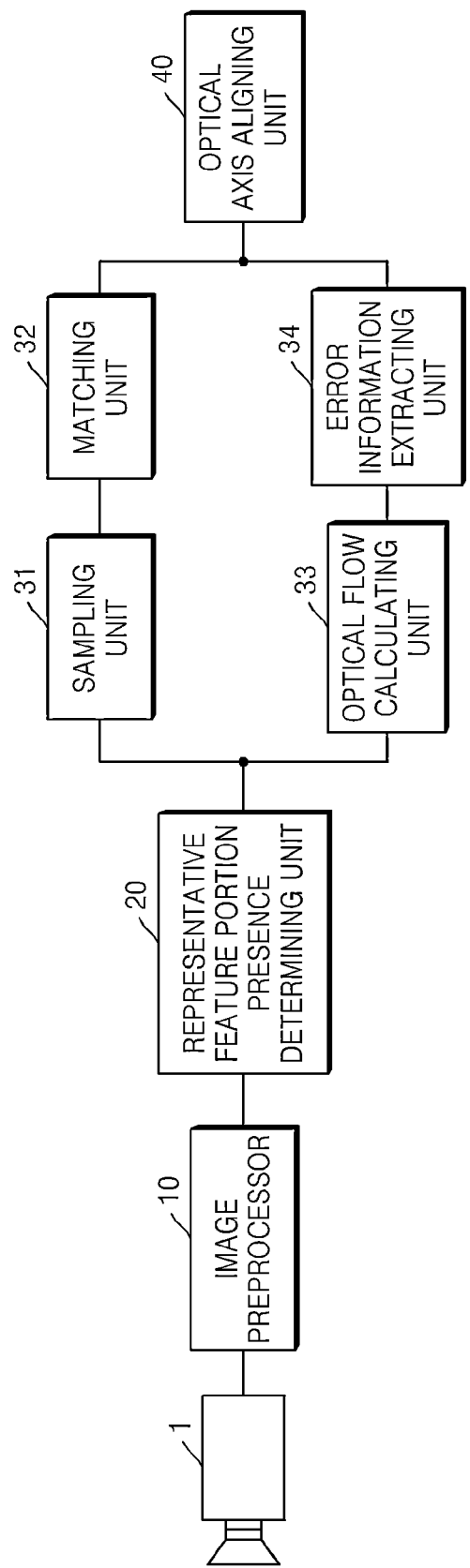
FIG. 2 is a block diagram of an image stabilization system according to an exemplary embodiment.

FIG. 2 is a block diagram of an image stabilization system according to an exemplary embodiment.

Referring to FIG. 2, the image stabilization system includes a zoom camera 1, an image preprocessor 10, a representative feature portion presence determining unit 20, a sampling unit 31, a matching unit 32, an optical flow calculating unit 33, an error information extracting unit 34, and an optical axis aligning unit 40.

The zoom camera 1 is installed in an area where image capture is required and provides an image obtained capturing the area. The zoom camera 1 is an apparatus capable of capturing an image, for example, a camera, a camcorder, or a closed-circuit television (CCTV). In the current embodiment, the zoom camera 1 may provide a function to enlarge an input image.

The image preprocessor 10 converts an analog signal of image data input by the zoom camera 1 into a digital signal. Although the image preprocessor 10 is disposed outside of the zoom camera 1 in FIG. 2, the image preprocessor 10 may be disposed inside the zoom camera 1.

The representative feature portion presence determining unit 20 determines whether the input image obtained from the zoom camera 1 has a feature portion.

In the current embodiment, a representative feature portion of an image refers to a portion of the image which is a criterion used to determine an optical axis error in an input image. In other words, the representative feature portion refers to a portion of the image having a particularly high illuminance and a distinctive shape so that even comparing an enlarged image with the image before its enlargement during image processing, a user may clearly recognize that both images are the same. In the current embodiment, the input image may have one or more representative feature portions.

FIGS. 3A to 3D are views showing examples for detecting a representative feature portion according to an exemplary embodiment.

Figure 3A:
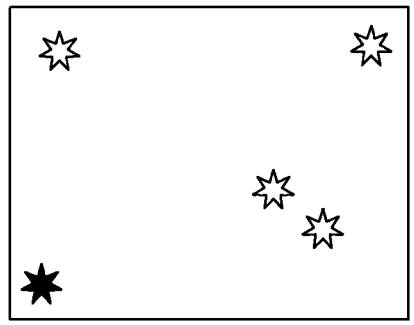
FIGS. 3A to 3D are views showing examples for detecting a representative feature portion according to an exemplary embodiment.
Figure 3B:
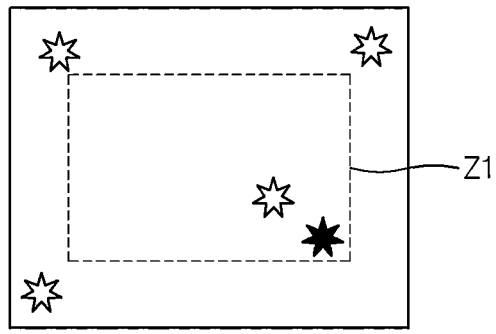
Figure 3C:
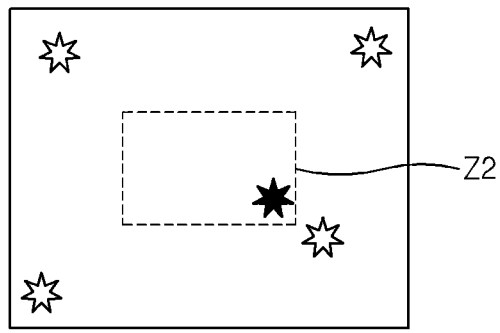

Referring to FIG. 3A, when a portion marked with a star in an image is referred to as a feature portion, the image of FIG. 3A has a plurality of feature portions. In this case, the representative feature portion presence determining unit 20 may determine a portion where some of a plurality of feature portions overlap with one another or a strong feature portion to be a candidate feature portion. In FIGS. 3A to 3C, the candidate feature portion determined to be a representative feature portion by the representative feature portion presence determining unit 20 is marked with a black star.

Referring to FIG. 3B, when the image is enlarged by zooming in the zoom camera 1, an enlarged image of an area Z1 may not include a candidate feature portion. In this case, the representative feature portion presence determining unit 20 may redetermine the candidate feature portion in the area Z1. By repeating the above-described process, assuming that an image of an area Z2 in FIG. 3C is a finally enlarged image by zooming in the zoom camera 1, if the image of the enlarged area Z2 includes a candidate feature portion, the representative feature portion presence determining unit 20 may determine the candidate feature portion to be a representative feature portion.

Figure 3D:
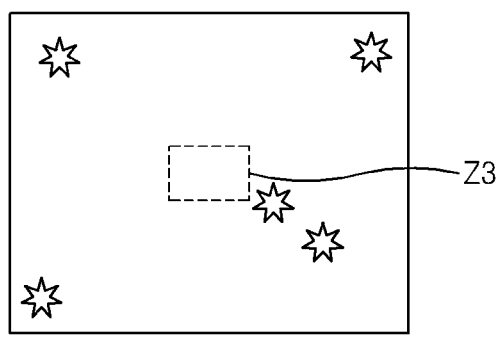

Alternatively, assuming that an image of an area Z3 in FIG. 3D is a finally enlarged image, if the finally enlarged image does not include any feature portion or a feature portion that can be regarded as a representative feature portion, the representative feature portion presence determining unit 20 may determine that the image does not include a representative feature portion. If the image does not include a representative feature portion, optical axis error information may be obtained by using optical flow information, as described later.

In addition, the representative feature portion presence determining unit 20 may determine whether an input image includes a representative feature portion only in a specific direction. In the zoom camera 1, since an optical axis error generally occurs only in one direction, the representative feature portion presence determining unit 20 may determine the presence of a feature portion only in a direction in which the optical axis error occurs to reduce an amount of operations.

Figure 4:
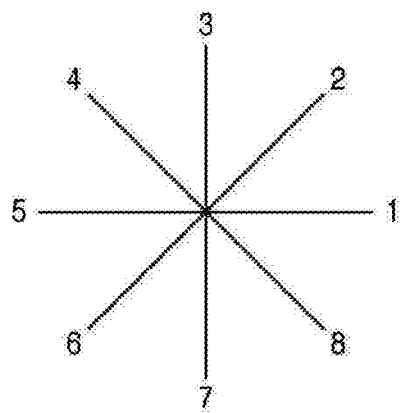
FIG. 4 is a view showing that a direction in which an optical axis error may occur is approximated to eight directions according to an exemplary embodiment.

FIG. 4 is a view showing that a direction in which an optical axis error may occur is approximated to eight directions according to an exemplary embodiment.

Referring to FIG. 4, it is assumed that an optical axis error occurs only in eight directions of No. 1 to No. 8. In detail, the optical axis error between −22.5 degrees and +22.5 degrees is approximated such that the optical axis error occurs in a direction at +0 degrees. The representative feature portion presence determining unit 20 may determine the presence of a representative feature portion only in eight directions as shown in FIG. 4 so as to reduce an amount of operations compared to when the presence of the representative feature portion in all directions is detected.

Hereinafter, a method of image stabilization if the representative feature portion presence determining unit 20 determines that an image includes a feature portion will be described. A method of image stabilization if the representative feature portion presence determining unit 20 determines that an image does not include a feature portion will be described later.

The sampling unit 31 samples a portion of an image including a feature portion. An area where the sampling is performed by the sampling unit 31 includes a feature portion and may have a size suitable for matching between images. In the current embodiment, if an input image includes a plurality of feature portions, the input image may include a plurality of sampled areas as well.

Also, the sampling unit 31 may obtain a central coordinate of the sampled area. The central coordinate obtained from the sampled area may be represented by (x_s, y_s).

Figure 1B:
Figure 1C:
Figure 5A:
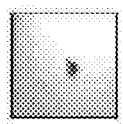
FIGS. 5A to 5C are views showing an image obtained by sampling the image of FIGS. 1A to 1C, an image obtained by enlarging the sampled image, and an image obtained by matching the sampled image with an enlarged or resized image of the sampled image, respectively, according to an exemplary embodiment.
Figure 5B:
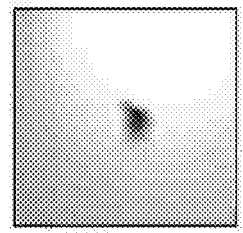
Figure 5C:

FIGS. 5A to 5C are views showing an image obtained by sampling the image of FIGS. 1A to 1C, an image obtained by enlarging the sampled image, and an image obtained by matching the sampled image with an enlarged or resized image of the sampled image, respectively, according to an exemplary embodiment.

Referring to FIG. 5A, the portion marked with '+' in the image of FIG. 1A, that is, a central area and a peripheral area of the image, are sampled. In other words, if the representative feature portion presence determining unit 20 determines that a light in the center of the image is a representative feature portion, a predetermined area including the light may be obtained as a sampled image as shown in FIG. 5A. Also, the sampling unit 31 may resize the sampled image, as shown in FIG. 5B, to perform template matching to be described below.

Referring back to FIG. 2, the matching unit 32 matches a sampled image with an enlarged image of the input image. If the input image is enlarged at a magnification equal to or less than 2.5, the matching unit 32 performs matching by scale invariant feature transform (SIFT) matching. The SIFT matching is used to smoothly match images by extracting a feature point generated in an edge or a vertex of an object as a vector even though the image is changed due to, for example, a change in a size, rotation, or a change in light. In other words, the SIFT matching may match the enlarged input image with the sampled image regardless of a size and a direction of the image in view of characteristics of the SIFT matching.

On the contrary, the matching unit 32 may enlarge the input image at a remaining magnification after matching if the input image is enlarged at a magnification equal to or greater than 2.5, and may perform a repetitive compensating method including matching and compensating for the sampled image if an optical axis is moved. Accordingly, the matching unit 32 may perform template matching by resizing the sampled image by a magnification at which the sampled portion is enlarged if the input image is enlarged at a magnification equal to or greater than 2.5.

Also, the matching unit 32 obtains a central coordinate of the matched area after the matching. Referring back to FIGS. 5A to 5C, the matching unit 32 may obtain a central coordinate of a matched area in the image of FIG. 5A, for example, that is, a central coordinate of a brightest area. The obtained central coordinate may be represented by (x_m, y_m). The optical axis aligning unit 40 may move the zoom camera 1 by (x_s-x_m) in a pan direction and by (y_s-y_m) in a tilt direction by using the obtained central coordinate.

Hereinafter, a method of image stabilization if the representative feature portion presence determining unit 20 determines that an image does not include a feature portion will be described.

If the representative feature portion presence determining unit 20 determines that an image does not include a representative feature portion and a plurality of feature points are scattered throughout the image, a general SIFT matching method or template matching method may not be used. In this case, the representative feature portion presence determining unit 20 extracts and compensates for an optical axis error of the zoom camera 1 by calculating an optical flow between images. According to an exemplary embodiment, the representative feature portion presence determining unit 20 may determine that an image does not include a representative feature portion if the image does not have any portion with an illuminance level higher than a predetermined level.

In detail, the optical flow calculating unit 33 calculates an optical flow between images while the zoom camera 1 is enlarging the images. The optical flow calculating unit 33 may set an image before its enlargement as an image A_0 and may set an image after a predetermined period of time elapses (after N frames) as an image A_1, where N is an integer greater than or equal to 1. To calculate an optical flow of an image in every frame increases an amount of operations, and thus, process efficiency may be decreased. Accordingly, in the current embodiment, the amount of operations may be reduced without missing a feature portion by calculating an optical flow of an image at predetermined frames.

The optical flow calculating unit 33 may store optical flow information at the time of enlargement using the image A_0 and the image A_1 as OF_1. By using such a method, the optical flow calculating unit 33 may obtain image information A_0, A_1, A_2, ..., A_k at every (N+1)-th frame and obtains optical flow information OF_0, OF_1, OF_2, ..., OF_k-1 between images, where k is an integers greater than or equal to 1.

The error information extracting unit 34 obtains distances from centers of images of the optical flows by using the obtained optical flow information, and then, forms a two-dimensional (2D) histogram with respect to L distances and M directions, where L and M each are integers greater than or equal to 1. The error information extracting unit 34 extracts a minimum value and a maximum value of an optical flow with respect to each direction at each distance with reference to the formed 2D histogram. Here, since a size of an optical flow is proportional to a distance from the center of the image in view of characteristics of a camera curvature, reliable information may be extracted by obtaining the direction and the size of the optical flow for each of the distances, and thus, the error information extracting unit 34 obtains distances of optical flow feature portions from the center of the image.

Figure 6:
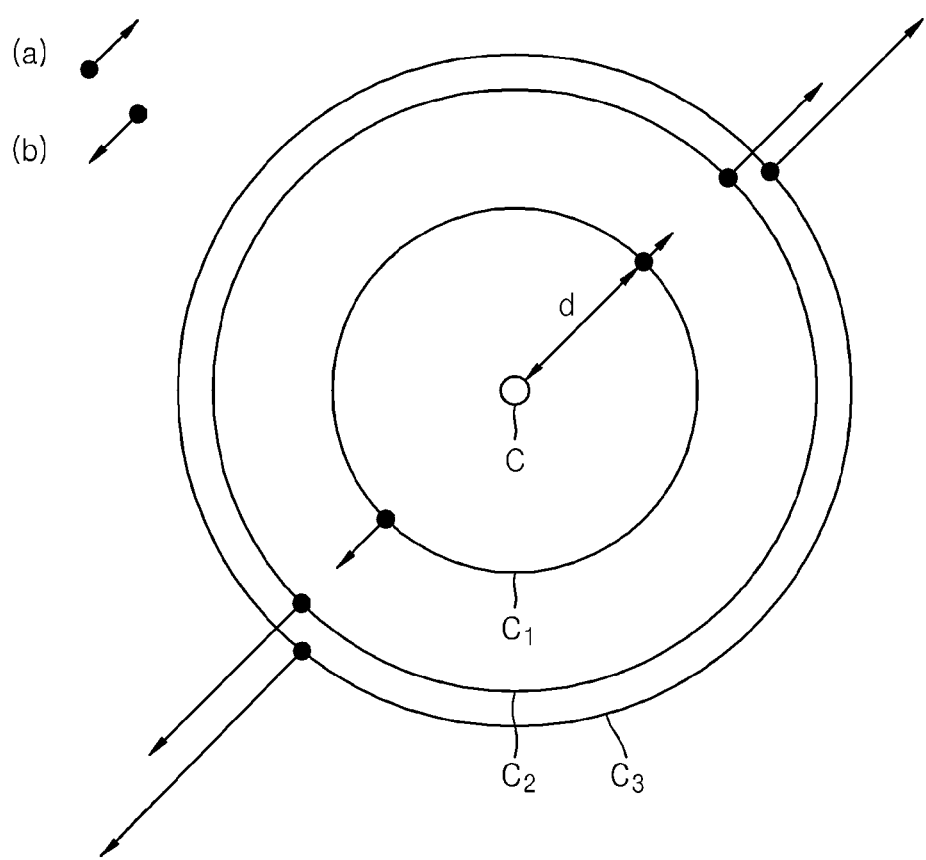
FIG. 6 is a view showing size information of an optical flow according to distances from a center of an image when an optical axis is moved to the right upper side according to an exemplary embodiment.

FIG. 6 is a view showing size information of an optical flow according to distances from a center of an image when an optical axis is moved to the right upper side according to an exemplary embodiment.

FIG. 6 shows when an optical axis of the zoom camera 1 is moved to the upper-right side, in a direction (a). If the optical axis of the zoom camera 1 is not moved, an optical flow of an area C1 spaced apart from a center C of an image at a distance d will have a radial form outside of a circle in an equal size.

However, referring to FIG. 6, in an optical flow of an area C1 spaced apart from the center C of the image at the distance d, the direction (a) has a size smaller than that of a direction (b). In other words, an optical flow in the direction (a) located on the area C1 and an optical flow in the direction (b) have different sizes, unlike a case where the optical axis error does not occur. Similarly, in areas C2 and C3 spaced apart from the center C of the image at different distances, the optical flow in the direction (a) is smaller than that in the direction (b) because the center C of the image is moved in the direction (a) compared to the image before its enlargement.

Also, referring to FIG. 6, as the distance from the center C of the image increases, the size of the optical flow increases. The size of the optical flow increases in the order of the areas C1, C2, and C3 because the area that is far away from the center C of the image moves further when enlarging the image by using the zoom camera 1.

Referring back to FIG. 2, the error information extracting unit 34 may form a histogram in M directions with respect to L distances by using the optical flow information obtained by the optical flow calculating unit 33. Regarding the L distances, the error information extracting unit 34 may set the L distances at an appropriate level within a range in which an amount of operations is not excessively increased. For example, L may be three as in FIG. 6. Also, as described above with reference to FIG. 4, the M directions may be set to eight. If the entire angle area is divided into eight, as shown in FIG. 4, approximation with respect to the angle is performed, and thus, an approximate value with respect to an adjacent direction may be considered to decrease an error.

The error information extracting unit 34 extracts a minimum value and a maximum value of an optical flow with respect to each direction at each distance based on the formed histogram. Here, since the size of the optical flow is proportional to the distance from the center of the image in view of characteristics of an optical axis error of the zoom camera 1, directions and sizes of the optical flow are different from one another, and thus, the error information extracting unit 34 extracts the minimum value and the maximum value.

In other words, referring back to FIG. 6, sizes of optical flows at an area in a same distance from the center C (for example, C1) are different from each other, and the sizes of the optical flows are different from one another in the areas C1, C2, and C3 spaced apart from the center C of the image at different distances. In other words, as the distance from the center C of the image increases, the size of the optical flow increases, and the optical flow in the direction (a) that is the same as the direction of the optical axis error is smaller than the optical flow in the direction (b). Accordingly, reliable error compensation may be performed by obtaining optical axis error data with respect to both the distance and direction.

The error information extracting unit 34 determines whether directions of the minimum and maximum values are symmetrical to each other, and, if the directions of the minimum and maximum values are symmetrical to each other, obtains a difference between the minimum value and an average value of the optical flows at each distance. Based on the difference between the minimum value and the average value of the optical flows at each distance, the error information extracting unit extracts the error information by calculating a sum of the differences at the L distances and dividing the sum by L. Here, since an optical axis is generally moved, the directions of the minimum and maximum values are symmetrical to each other.

In other words, as shown in FIG. 6, the size of the optical flow is small in the direction (a) in which the optical axis is moved and is large in the direction (b) opposite to the direction (a), the directions of the minimum and maximum values are symmetrical to each other. If the directions of the minimum and maximum values are not symmetrical to each other, it is determined that the optical axis is not moved to any one direction, which makes it difficult to extract optical axis error information by using a change in the optical flow.

If the directions of the minimum and maximum values pass the aforementioned symmetry test, the error information extracting unit 34 obtains a difference between the minimum value and the average value of optical flows at each of the L distances, adds up the differences obtained at the L distances, and divides a sum of the differences by L to extract error information of an optical axis. That is, the error information extracting unit 34 may obtain the optical axis error information by using the calculated average value. Referring back to FIG. 6, the optical axis error information in the distance C1 may be obtained by calculating a difference between the minimum value and the average value of the optical flows at the distance C1.

Finally, the optical axis aligning unit 40 compensates for an optical axis error by using the optical axis error information obtained by the matching unit 32 and the error information extracting unit 34. Here, the compensation for the optical axis error may be performed through image processing by converting a degree to which an optical axis is moved into a coordinate instead of using a physical method.

Figure 7:
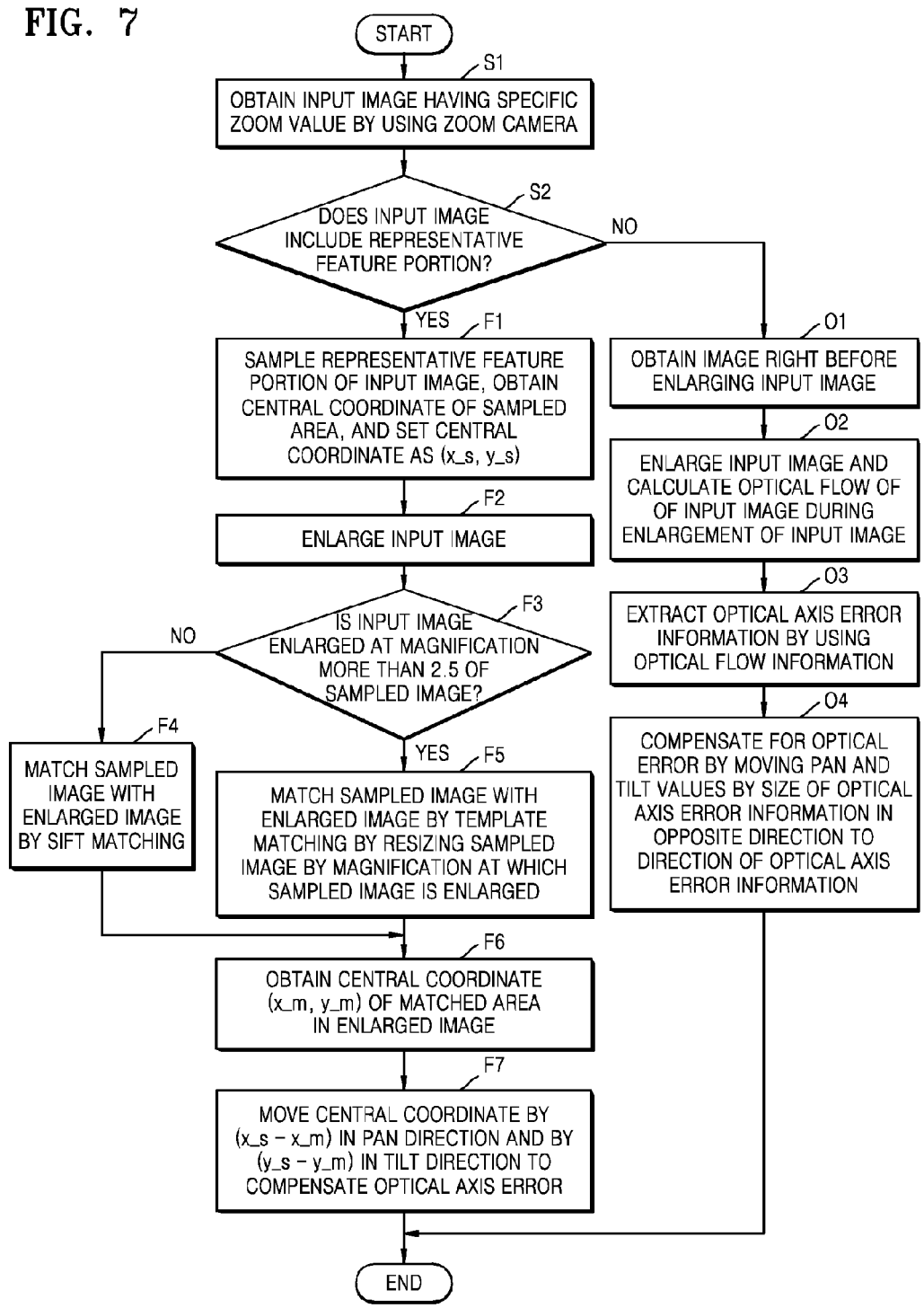
FIG. 7 is a flowchart for describing an image stabilization system according to an exemplary embodiment.

FIG. 7 is a flowchart for describing an image stabilization system according to an exemplary embodiment.

Referring to FIG. 7, the image stabilization system obtains an input image having a specific zoom value by using the zoom camera 1 (operation S1).

Next, the representative feature portion presence determining unit 20 determines whether the obtained input image includes a representative feature portion (operation S2). As described above, the representative feature portion may refer to a portion of the input image set as a representative value to compensate for the optical axis error from among a plurality of distinctive feature portions during image processing.

Next, if the representative feature portion presence determining unit 20 determines that the input image includes the representative feature portion, the representative feature portion of the input image is sampled to generate a sampled image, and a central coordinate of a sampled area is obtained and set as (x_s, y_s) (operation F1).

Next, the input image is enlarged by using the zoom camera 1, and image information of an enlarged area of the input image is obtained (operation F2).

Then, it is determined whether the sampled image is enlarged at a magnification equal to or less than 2.5 (operation F3).

If the input image is enlarged at a magnification equal to or less than 2.5, the sampled image and enlarged input image are matched with each other by SIFT matching (operation F4). On the contrary, if the input image is enlarged at a magnification equal to or greater than 2.5, the sampled image may be resized by the magnification at which the input image is enlarged, and then the sampled image and enlarged input image are matched with each other by template matching (operation F5).

Next, a central coordinate (x_m, y_m) of a matched area in the enlarged image is obtained (operation F6).

Finally, the optical axis aligning unit 40 aligns the moved optical axis by moving the central coordinate by (x_s-x_m) in a pan direction and by (y_s-y_m) in a tilt direction to compensate for the optical axis error.

On the other hand, if the representative feature portion presence determining unit 20 determines that the input image does not include a representative feature portion, the optical flow calculating unit 33 obtains an image right before enlarging the input image (operation O1).

Next, the optical flow calculating unit 33 enlarges an image by using the zoom camera 1 and calculates an optical flow of the image during the enlargement of the image (operation O2).

Next, the error information extracting unit 34 extracts optical axis error information by using optical flow information (operation O3). As described above, the error information extracting unit 34 may obtain the optical axis error information based on the optical flow information in a movement direction of the optical flow and an opposite direction thereto by using a fact that an optical axis is moved only in one direction.

Finally, the optical axis aligning unit 40 compensates for an optical error by moving pan and tilt values by a size of the optical axis error information in an opposite direction to a direction of the optical axis error information (operation O4).

Figure 8:
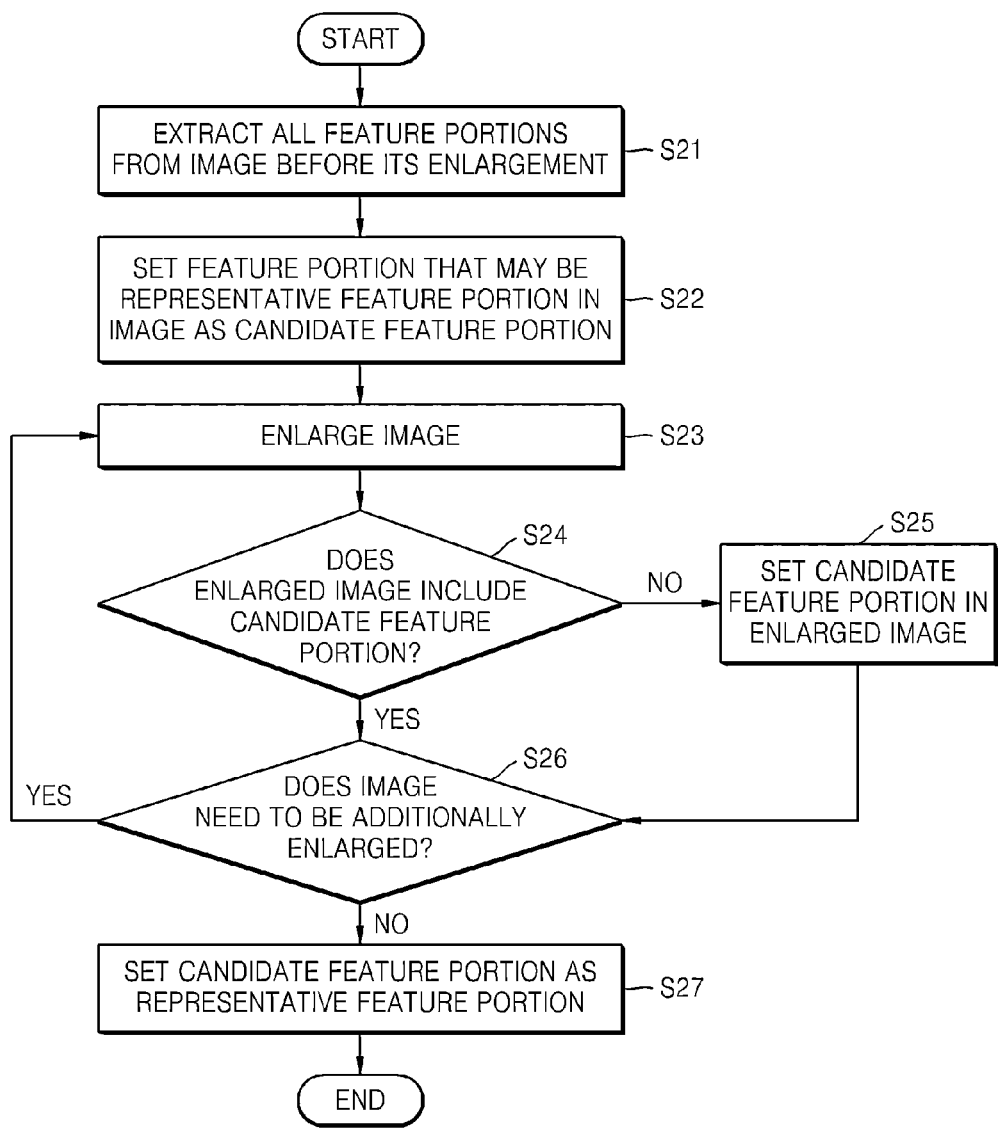
FIG. 8 is a flowchart for describing a method of determining whether an image includes a representative feature portion, according to an exemplary embodiment.

FIG. 8 is a flowchart for describing a method of determining whether an image includes a representative feature portion, according to an exemplary embodiment.

Referring to FIG. 8, the representative feature portion presence determining unit 20 extracts all feature portions from an image before its enlargement (operation S21).

Next, a feature portion that may be a representative feature portion in the image is set as a candidate feature portion (operation S22), and the image is enlarged (operation S23).

Next, it is determined if the enlarged image includes a candidate feature portion (operation S24). If the enlarged image does not include a candidate feature portion, the candidate feature portion is reset in the enlarged image (operation S25).

Otherwise, if the enlarged image includes a candidate feature portion, it is determined whether the image needs to be additionally enlarged (operation S26). If the image needs to be additionally enlarged, the method returns to operation S23, and the operation is repeated.

Otherwise, if the image does not need to be additionally enlarged, the representative feature portion presence determining unit 20 sets the set candidate feature portion as a representative feature portion (operation S27). Although not shown in FIG. 8, when the representative feature portion presence determining unit 20 may not set a representative feature portion regardless of a process shown in FIG. 8, the representative feature portion presence determining unit 20 may determine that the input image does not include a representative feature portion.

Figure 9:
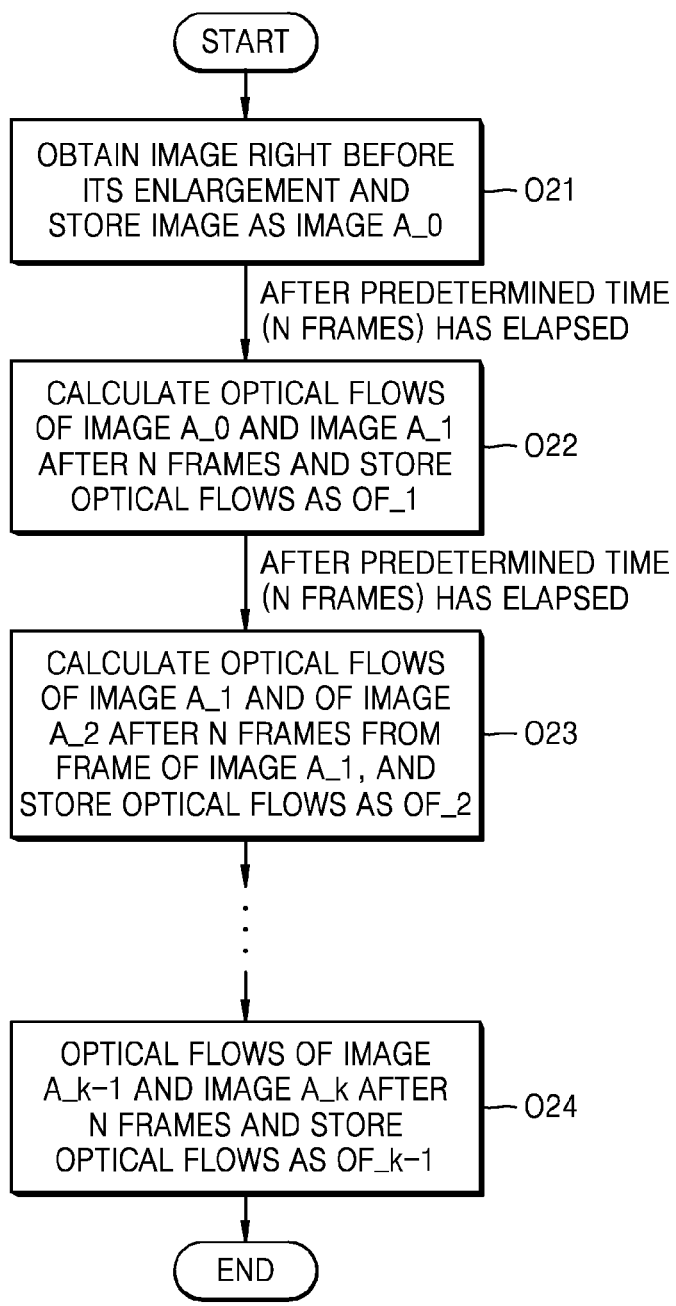
FIG. 9 is a flowchart for describing a process of calculating an optical flow by an optical flow calculating unit, according to an exemplary embodiment.

FIG. 9 is a flowchart for describing a process of calculating an optical flow by the optical flow calculating unit 33, according to an exemplary embodiment.

Referring to FIG. 9, the optical flow calculating unit 33 obtains an image right before its enlargement and stores the image as an image A_0 (operation O21).

Next, the optical flow calculating unit 33 calculates optical flows between the image A_0 and an image A_1 after N frames, and stores the optical flows as OF_1 (operation O22).

Next, the optical flow calculating unit 33 calculates optical flows between the image A_1 and of an image A_2 after N frames from the frame of the image A_1, and stores the optical flows as OF_2 (operation O23).

The optical flow calculating unit 33 calculates optical flows of an image A_k−1 and an image A_k at an interval of N frames, and stores the optical flows as OF_k−1 by using the above-described method (operation O24). For the efficiency of operation, the optical flow calculating unit 33 calculates an optical frame in every (N+1)-th frame instead of calculating an optical flow of an image in every frame.

Figure 10:
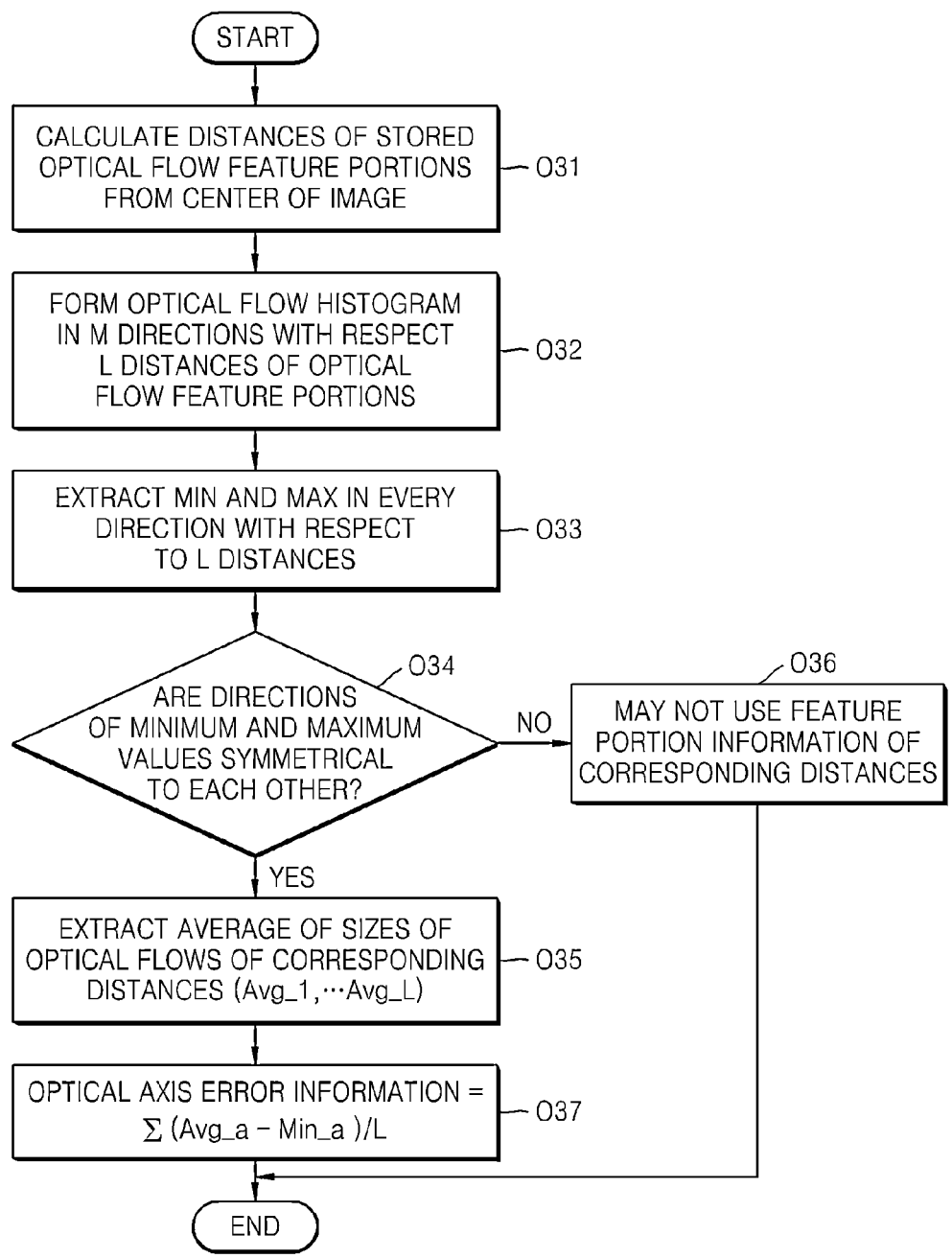
FIG. 10 is a flowchart for describing a process of extracting an optical axis error by using optical flow information by an error information extracting unit, according to an exemplary embodiment.

FIG. 10 is a flowchart for describing a process of extracting an optical axis error by using optical flow information by the error information extracting unit 34, according to an exemplary embodiment.

Referring to FIG. 10, the error information extracting unit 34 calculates distances of stored optical flow feature portions from a center of an image (operation O31).

Next, the error information extracting unit 34 forms an optical flow histogram in M directions with respect to the L distances from the center of the image (operation O32). As described above, referring to FIGS. 4 and 6, the error information extracting unit 34 may form the optical flow histogram in eight directions with respect to three distances from the center of the image.

Next, the error information extracting unit 34 extracts a maximum value and a minimum value in every direction with respect to the L distances (operation O33). As described above, when an optical axis is moved in any one direction, an optical flow in the direction in which the optical axis is moved has a minimum value and an optical flow in an opposite direction to the direction in which the optical axis is moved has a maximum value. The error information extracting unit 34 may calculate optical axis error information by using a difference between the maximum value and the minimum value.

Next, the error information extracting unit 34 determines whether directions of the minimum and maximum values are symmetrical to each other at each of the L distances (operation O34). If the optical axis is moved in any one direction, the directions of the minimum and maximum values are symmetrical to each other.

If the directions of the minimum and maximum values are symmetrical to each other at each of the L distances, the error information extracting unit 34 extracts an average value of optical flows at each of the L distances and stores the average values as (Avg_1, . . . , Avg_L) (operation O35).

On the other hand, if the directions of the minimum and maximum values are not symmetrical to each other, the optical axis is moved in various directions, and thus, the error information extracting unit 34 may not use feature portion information of the corresponding distances (operation O36).

Finally, the error information extracting unit 34 may extract the optical axis error information by obtaining a difference between the minimum value and the average value of optical flows at each of the L distances, adding up the differences obtained at the L distances, and dividing a sum of the differences by L. In other words, the optical axis error information may be obtained by an equation, $\Sigma(Avg\_a - Min\_a)/L$, where a is 1 to L. (operation O37).

According to the above exemplary embodiments, an optical axis error system may effectively compensate for an optical axis error through image processing.

Also, the optical axis error may be compensated through image processing without physically changing setting of a zoom camera.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A method of image stabilization, the method comprising:
    determining whether an input image comprises a representative feature portion;
    sampling the representative feature portion to generate a sampled image if it is determined that the input image comprises the representative feature portion;
    enlarging the input image optically by a magnification factor and matching the enlarged input image with the sampled image or a resized sample image to obtain central coordinates of the enlarged input image, wherein the resized sample image is obtained by the magnification factor; and
    aligning an optical axis by calculating a difference between the central coordinates of the enlarged input image and the central coordinates of the sampled image.

2. The method of claim 1, wherein the representative feature portion has a luminance level higher than a predetermined level or comprises a predetermined shape, and is selected from among a plurality of feature portions in the input image.

3. The method of claim 1, wherein the determining whether the input image comprises a representative feature portion comprises:
    extracting a plurality of feature portions from the input image;
    selecting a candidate feature portion having a predetermined feature from among the extracted plurality of feature portions; and
    determining that the input image comprises the representative feature portion if the enlarged input image comprises the candidate feature portion, and determining that the input image does not comprise the representative feature portion if the enlarged input image does not comprise the candidate feature portion.

4. The method of claim 1, wherein the matching the enlarged input image with the sample image comprises performing scale invariant feature transform (SIFT) matching if the magnification factor is equal to or less than 2.5.

5. The method of claim 1, wherein the matching the enlarged input image with the resized sample image comprises performing template matching if the magnification factor is greater than 2.5.

6. An image stabilization system comprising:
    a zoom camera;
    an image preprocessor that converts an analog input signal input from the zoom camera into a digital signal;

the system is further configured to:

determine whether an input image comprises a representative feature portion;

sample the representative feature portion to generate a sample image if it is determined that the input image comprises the representative feature portion;

enlarge the input image optically by a magnification factor and match the enlarged input image with the sample image or a resized sample image to obtain central coordinates of the enlarged input image, where said resized sample image is obtained by resizing the sample image by said magnification factor; and align an optical axis by calculating a difference between the central coordinates of the enlarged input image and the central coordinates of the sample image.

7. The image stabilization system of claim 6, wherein the representative feature portion has a luminance level higher than a predetermined level or comprises a predetermined shape, and is selected from among a plurality of feature portions in the input image.

8. The image stabilization system of claim 6, further comprising:

determining that the input image comprises the representative feature portion if the enlarged input image comprises a candidate feature portion, and determining that the input image does not comprise the representative feature portion if the enlarged input image does not comprise the candidate feature portion, wherein the candidate feature portion has a predetermined feature and is selected from a plurality of feature portions extracted from the image.

9. The image stabilization system of claim 6, wherein the enlarged input image is matched with the sample image by scale invariant feature transform (SIFT) matching if the magnification factor is equal to or less than 2.5.

10. The image stabilization system of claim 6, wherein the enlarged input image is matched with the resized sample image by template matching if the magnification factor is greater than 2.5.

* * * * *